US008079302B2

(12) United States Patent  (10) Patent No.: US 8,079,302 B2
Giangrasso et al.  (45) Date of Patent: Dec. 20, 2011

(54) PORTABLE COOKING UNIT

(76) Inventors: Steven Giangrasso, Rockville Centre, NY (US); Paul Giangrasso, East Islip, NY (US)

(*) Notice: Subject to any disclaimer, the term of this patent is extended or adjusted under 35 U.S.C. 154(b) by 611 days.

(21) Appl. No.: 12/287,826

(22) Filed: Oct. 15, 2008

(65) Prior Publication Data

US 2010/0089249 A1  Apr. 15, 2010

(51) Int. Cl.
*A47J 43/00*  (2006.01)

(52) U.S. Cl. ............ 99/449; 99/339; 99/340; 99/447; 99/448; 99/450; 219/386; 219/387; 219/403; 219/404; 219/428; 219/472; 126/4; 126/9 B; 126/9 R; 126/275 R

(58) Field of Classification Search ............ 99/339, 99/340, 447, 449; 126/9 R, 9 B, 275 R; 219/386, 219/387, 403, 404
See application file for complete search history.

(56) References Cited

U.S. PATENT DOCUMENTS

| 4,646,711 | A | * | 3/1987 | Oliphant | 126/9 R |
|---|---|---|---|---|---|
| 4,920,873 | A | * | 5/1990 | Stevens | 99/339 |
| 4,922,887 | A | * | 5/1990 | Foxford | 126/41 R |
| 5,243,961 | A | * | 9/1993 | Harris | 126/9 R |
| 5,339,728 | A | * | 8/1994 | Marchwiak et al. | 99/426 |
| 5,467,697 | A | * | 11/1995 | Hunziker | 99/449 |
| 5,473,979 | A | * | 12/1995 | Ruben | 99/446 |
| 5,490,452 | A | * | 2/1996 | Schlosser et al. | 99/422 |
| 5,511,467 | A | * | 4/1996 | Motley et al. | 99/426 |
| 5,711,210 | A | * | 1/1998 | Kaufman | 99/340 |
| 5,722,316 | A | * | 3/1998 | Rutland, Jr. | 99/426 |
| 5,782,165 | A | * | 7/1998 | Glenboski et al. | 99/340 |
| 5,891,498 | A | * | 4/1999 | Boehler | 426/314 |
| 5,906,196 | A | * | 5/1999 | Measom | 126/304 A |
| 6,035,768 | A | * | 3/2000 | Kaufman | 99/449 |
| 6,038,965 | A | * | 3/2000 | Thorndyke | 99/340 |
| 6,089,145 | A | * | 7/2000 | Watson | 99/339 |
| 6,105,487 | A | * | 8/2000 | Nash et al. | 99/400 |
| 6,135,014 | A | * | 10/2000 | Chang | 99/339 |
| 6,213,005 | B1 | * | 4/2001 | Sherman et al. | 99/426 |
| 6,321,640 | B1 | * | 11/2001 | Tseng | 99/340 |
| 6,439,111 | B1 | * | 8/2002 | Lu | 99/449 |
| 6,543,435 | B1 | * | 4/2003 | Regen et al. | 126/25 R |
| 6,591,828 | B1 | * | 7/2003 | Schneider | 126/9 R |
| 6,622,616 | B1 | * | 9/2003 | Measom | 99/345 |
| 6,708,604 | B1 | * | 3/2004 | Deichler, Jr. | 99/482 |
| 6,718,865 | B1 | * | 4/2004 | Monteleone | 99/340 |
| 6,874,496 | B2 | * | 4/2005 | Waits et al. | 126/25 R |
| 6,962,106 | B2 | * | 11/2005 | Viraldo | 99/339 |
| 7,334,576 | B2 | * | 2/2008 | Chung | 126/25 R |
| 7,703,386 | B1 | * | 4/2010 | Bourgeois et al. | 99/340 |

(Continued)

*Primary Examiner* — Gene Kim
*Assistant Examiner* — Alexander Niconovich
(74) *Attorney, Agent, or Firm* — Alfred M. Walker

(57) ABSTRACT

Described here is a rectangular, parallelepiped shaped, portable cooking device that consists of a rigid Stand, with attached lid and flaps, that supports multiple food heating containers. A dual purpose transport case/cooking cover, made of heat resistant materials, is a key feature to the design utility by securely transporting the device and acting as a heat efficiency Cover during the food heating process. When used in conjunction with the Stand flaps and lids, this Cover provides many innovations over prior art by preventing heat escape and weather intrusion. Various burner and fuel devices (i.e.: Sterno, Propane, Electric, Coal, Wood . . . ) can be used to provide the heat for this device. The combination of these multi-functional components, in a single compact, portable, modular unit provide significant improvements over current conventional devices by offering multiple options for food heating and serving with increased efficiency in space usage, heat efficiency and transportability.

7 Claims, 11 Drawing Sheets

U.S. PATENT DOCUMENTS

| | | | |
|---|---|---|---|
| 7,739,948 B2 * | 6/2010 | Backus et al. | 99/340 |
| 7,861,705 B2 * | 1/2011 | Hulsey | 126/25 A |
| 7,934,494 B1 * | 5/2011 | Schneider | 126/241 |
| 2002/0020304 A1 * | 2/2002 | Reynolds | 99/339 |
| 2003/0000396 A1 * | 1/2003 | Leonard | 99/482 |
| 2008/0092751 A1 * | 4/2008 | Backus et al. | 99/340 |

* cited by examiner

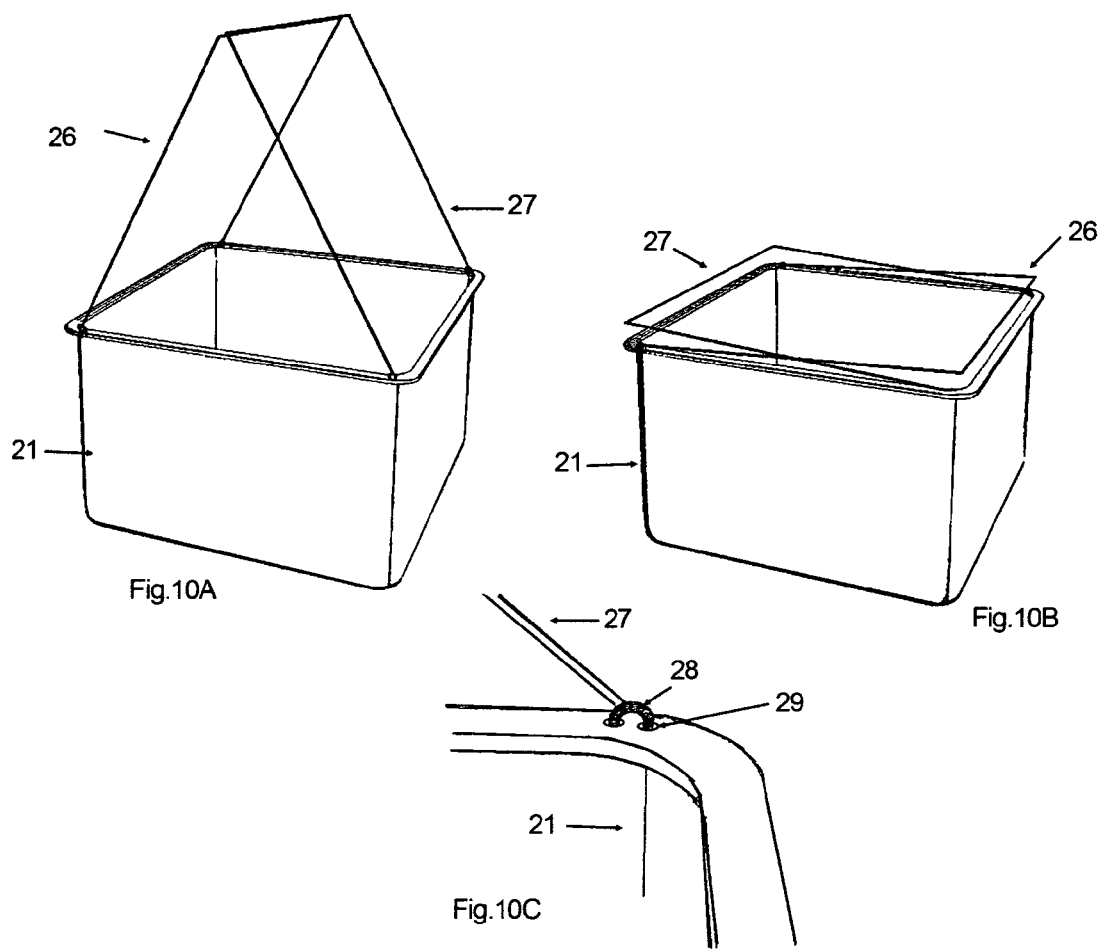

PORTABLE COOKING UNIT

This Application claims priority over Provisional Patent Application No. 60/998,263 Filing date: Oct. 10, 2007

REFERENCES CITED

U.S. Patent Documents

| | | | |
|---|---|---|---|
| 156,470 | November 1874 | Warner | 249/172 |
| 1,261,566 | April 1918 | Lewinsky | 249/172 |
| 1,464,889 | August 1923 | Stirn | 126/33 |
| 2,024,259 | December 1935 | Elkin | 126/33 |
| 2,520,543 | August 1950 | Hawkins | 296/22 |
| 3,828,966 | August 1974 | Martin | 220/7 |
| 4,920,873 | May 1990 | Stevens | 99/339 |
| 4,922,887 | May 1990 | Foxford | 126/41 R |
| 4,924,844 | May 1990 | Bransburg | 126/9 R |
| 4,958,618 | September 1990 | Davidson | 126/9 B |
| 4,962,696 | October 1990 | Gillis | 99/340 |
| 5,045,672 | September 1991 | Scott | 219/439 |
| 5,119,799 | June 1992 | Cowan | 126/9 R |
| 5,243,961 | September 1993 | Harris | 126/9 R |
| 5,287,800 | February 1994 | Orednick | 99/449 |
| 5,303,691 | April 1994 | Armistead | 126/9 R |

BACKGROUND OF INVENTION

1. Field of Invention

The present invention relates to a portable food cooking unit with multiple intra-fitting peripheral food containers. More specifically, the present invention relates to an improved method for transporting, heating and serving food in a compact, modular unit with heat efficiency functionality built into the design and instrumentation of the device.

2. Description of the Related Art

Conventional grilling, warming and heating devices seldom provide all of the necessary tools and containers that are necessary to prepare and serve multiple food options in a single utility design concept. A conventional Chaffing Stand seldom accounts for an efficient means to transport the necessary peripherals (Pots, Pans, Utensils . . . ) that are required to serve several dishes simultaneously in an efficient manner. The storage and transport of additional tools that are often needed, are shaped in an ill fitting configuration, making it a bulky and awkward process transport the device.

Another serious deficiency of existing heating devices is the lack efficiency due to heat escape. Heat producing burners or fuel canisters are often exposed to outside environmental elements that allow for heat to escape from the unit. The heat also frequently is not contained within any kind of heat resistant cover that surrounds the outside of the unit. This can lead to the food failing to stay uniformly warmed for an extended period of time without the continued burning of additional fuel.

Many of the existing methods also use disposable metal trays which are a wasteful use of resources and repetitive cost that must be addressed each time they are used.

Incidental contact with hot units can cause burns. A heat resistant cover around the unit can protect against accidental injury In summary the problems with existing products include:
1) Bulky setup, operation and transport for all of the necessary tools required to heat and serve food.
2) Poorly designed and inefficient means of retaining the heat generated, resulting in escape of heat and loss of the ability to maintain high temperatures without the constant burning of more fuel.
3) Lack of peripheral devices needed to complete the tasks necessary to heat and serve food within one unit.
4) Wasteful use of resources through disposable metal pans and trays.
5) Safety hazards caused by lack of outside heat resistant coverage.
6) Inconvenience of transport caused by irregular shaped devices that do not stack or sit securely.

SELECTED OBJECTS AND SUMMARY OF INVENTION

An object of the present invention seek to address shortcomings of the previous cooking devices and overcome the detriments of the conventional portable cooking units and chaffing devices as outlined above.

Another object of the present invention is to combine as many of the tools as are necessary to transport, store, heat and serve multiple foods in one, compact, modular unit that allows for ease of planning and transport by providing a system of intra-fitting pots, pans and utensils.

Another object of the present invention is to address the important issue of heat retention with a cost effective, multi-purposed cover and series of lids, weather protection flaps that are attached to the unit and work in conjunction with a heat resistant external cover.

Another object of the present invention is to provide a durable and reusable device supplies multiple heating containers that can be easily maintained with common, off the shelf cleaning products.

Another object of the present invention is to provide a stable, safely balanced device that is neither easily tipped or toppled.

Another object of the present invention is to provide options for different heat sources.

Another object of the present invention is to provide multiple containers that can be inter-fitting and options for the user to heat and serve multiple dishes all from a single, compact and portable device.

The present invention provides a rectangular, parallelepiped shaped device, with intra fitting cooking containers, that efficiently maximizes the food volume capacity in comparison to the amount of space it takes to transport. The device provides a system of lids and flaps that allow the users to open and close the device with ease and safety. The device comes with a heat resistant cover thereby adding safety and fuel efficiency benefits to it design.

According to the embodiment of the present invention it allows for an easily managed configuration of multiple food heating containers that positioned within a rigid and secure framed base, with a choice of heating unit options beneath the food container area. The burner chamber can be accessed by the operator from multiple positions. This burner section can also be covered to protect against heat loss and accidental burns with a system of corresponding flaps and heat resistant covers. This allows the heat source to be shielded from heat escape due to adverse weather conditions or open air exposure. The operator has the option to regulate of temperature or address environmental conditions by positioning the flap, or any combination of flaps, as required.

According to another embodiments of the invention, a grill top is provided that securely sits atop the Stand frame allowing it to be converted into a Grilling station. Either the existing Large Boiler Pot or Frying Pan containers would be covered in aluminum foil, as a protective covering to the surface of these containers from the direct contact with the burning fuel. Once covered, they could then be filled with charcoal, wood or any other grilling fuel substance of choice. The Stand also would be wrapped in an aluminum foil bonnet to protect surface from spark, hot ash or any other refuse created by the energy source.

According to another embodiment of the invention, uses a removable Frying Pan handle to attach to the pan container allowing for fried food preparation.

According to another embodiment of the invention, a perforated steamer pot is available that fits inside the Boiler pot to allow for tight fitting steaming station for various foods.

According to another embodiment of the invention, if ice were added to the large Boiler Pot the entire unit can be transformed into a cold storage solution to keep food fresh, crisp and safe from spoilage inside the smaller inter-fitting containers.

BRIEF DESCRIPTION OF DRAWINGS

The invention will be better understood and the above objects, as well as objects other than those set forth above, will become apparent when consideration is given to the following detailed description thereof. Such Description makes reference to the annexed drawing wherein.

5) Rigid Stand Frame Posts (1 of 4)
6) Rigid Stand Multi-Fold Lid
11) Rigid Stand Flap (1 of 4)
14) Rigid Stand Post Attachment for Flap Hook
21) Large Boiler Pot (in Rigid Stand—Heating Position)
22) (2) Half Pots that inter-fit inside (1) Boiler Pot
23) Quarter Pots (2) Food Containers that inter-fit inside (1) Half Pot
24) Tri-Pots (3) Food Containers that inter-fit inside (1) Half Pot

Figure 1:
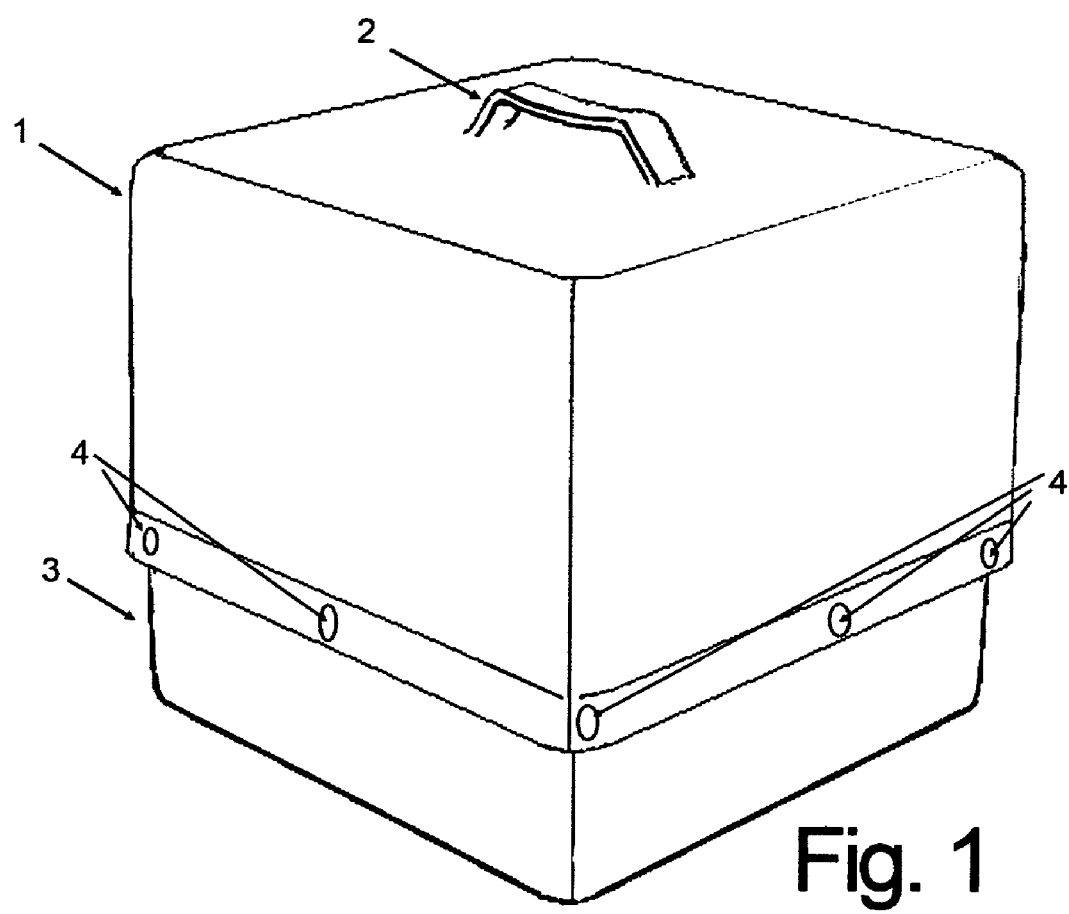
FIG. 1 is a perspective view of an embodiment of the Dual Transport Case/Heat Cover in a closed position.
1) Transport Case/Hood
2) Hood Carry Handle
3) Transport Case Base
4) Transport Case Fasteners

5) Rigid Stand Frame Post (1 of 4)
6) Rigid Stand Multi-Fold Lid
11) Rigid Stand Flap (1 of 4)
14) Rigid Stand Post Attachment for Flap Hook
21) Large Boiler Pot (in Rigid Stand—Heating Position)

FIG. 10A, 10B are illustrations of the Boiler Pot 21 and the handle mechanism that will be connected to all of the containers that essentially consist of a pair of opposing Rod handles 26, 27. Illustrated in FIG. 10C, is the Ring 28 that connects through holes 29 in the corners of the pot's rim with a bent loop at the end of the rod to rotate up and down.

21) Large Boiler Pot
26) Handle Rod A
27) Handle Rod B
28) Handle Rod Loop
29) Handle Rod Loop Holes in Pot Rim

DESCRIPTION OF THE PREFERRED
EMBODIMENTS OF THE INVENTION

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims.

The words used in this specification to describe the invention and its various embodiments are to be understood not only in the sense of their commonly defined meanings, but to the sense of their commonly defined meanings, but to include by special definition in the specification structure, materials or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are therefore, defined in this specification to include not only the combination of elements which are literally set forth, but all equivalent structure, materials or acts for performing substantially the same function in substantially the same way to obtain the substantially same result.

For a fuller understanding of the nature and desired objects of the invention, reference should be made to the following detailed description taken in connection with the accompanied drawings. Referring to the drawings wherein like reference numerals designate corresponding parts throughout figures is made first to FIG. 1.

FIG. 1 of the drawings illustrates the dual purpose Transport Case/Heating Cover, which is comprised of heat resistance materials, in its closed position. The Top Hood of the Case 1 is fastened to the Base 3 held together by multiple Snaps, Clips or Hook Fasteners 4 to unit can be securely closed to be carried by the Handle 2. For re-transport of the unit, it should be placed back into Base of the Transport Case/Heat Cover. All fasteners should be in a securely fixed closed position. The Transport Case can then be hand carried by the handle, shoulder straps or on any other choice of portable device.

Figure 2:
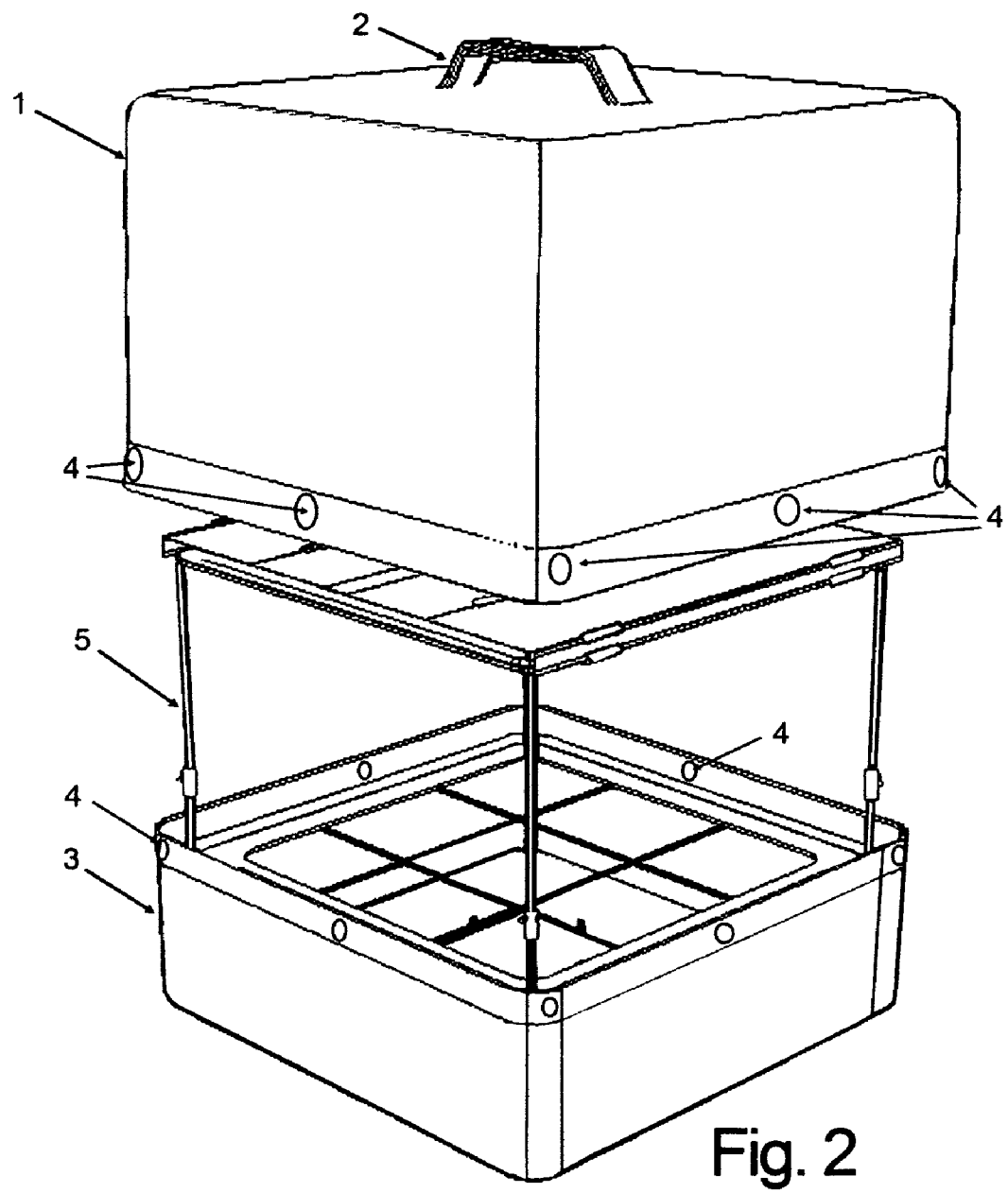
FIG. 2 is a perspective view of an embodiment of the Dual Transport Case/Heat Cover with the top Cover Hood lifted from the Cover base in an open position that shows the Rigid Stand inside the Case.
1) Transport Case/Hood
2) Hood Carry Handle
3) Transport Case Base
4) Transport Case Fasteners
5 Rigid Stand Frame Posts (1 of 4)

FIG. 2 illustrates the Transport Case with the Top Hood of the Case 1 unfastened to the Base 3 when the multiple Snaps, Clips or Hook Fasteners 4 have been detached from their corresponding connections. The Rigid Stand is comprised of four Posts 5 and is positioned inside the Base 3 as the Hood is lifted up. For the purposes of this illustration, the multiple container are not represented inside the Rigid Stand for a clear representation of how the Stand is positioned.

Figure 3:
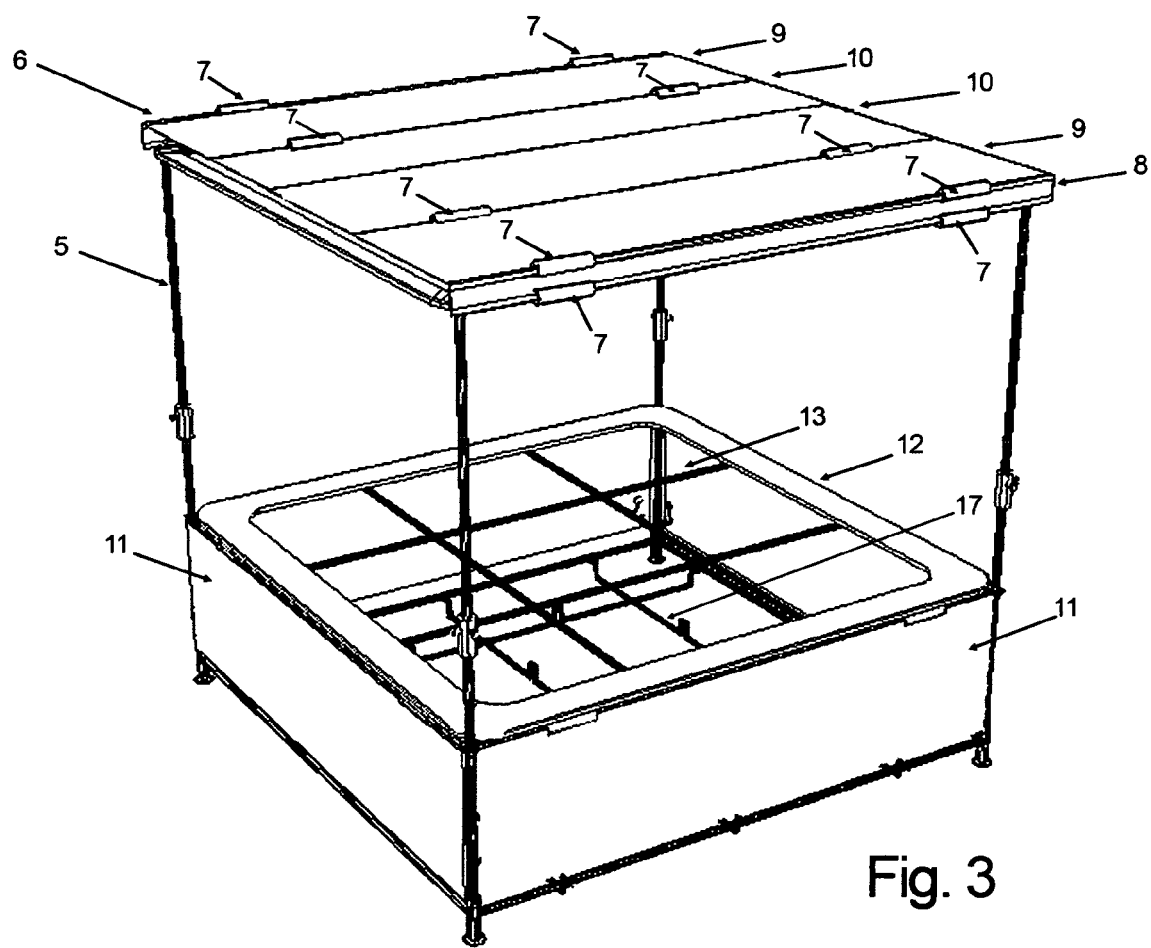
FIG. 3 is a perspective view of an embodiment of the Rigid Stand with its Lids and Flaps shown in a closed position.
5) Rigid Stand Frame Posts (1 of 4)
6) Rigid Stand Multi-Fold Lid
7) Lid Hinges
8) Lid Fold Panel A
9) Lid Fold Panel B
10) Lid Fold Panel C
11) Rigid Stand Flap (1 of 4)
12) Rigid Stand Base Food Container Platform
17) Rigid Stand Bottom Heat Supply Grid Support

FIG. 3 illustrates the component parts of the Rigid Stand's when it is removed from the Transport Case. The Stand is comprised of four Frame Posts 5 with an attached multi-folding Lid 6 and Flaps 11 shown here in their closed positions. The multi-folding Lid is comprised of two halves, each having three sections whereby the first section, Lid Panel A 8 is pivotally mounted to the Rigid Stand by Lid Hinges 7. This allows for variable stack height depths depending on the number of nested containers used. Lid Panel B 9 is pivotally connected to Panel A 8 by Lid Hinges 7 to allow for multiple options of Lid opening configurations. Lid Panel C 10 is pivotally connected to Panel B 9 by Lid Hinges 7 to allow for the option of opening only the center portion of the multi-folding Lid. The Stand is also comprises an open Food Container Platform 12 atop a set of perpendicular Grid Support Rods 13 that are connected to the Frame Posts 5 to support the weight of the Food Containers. The Heat Supply Grid Support 17 is a set of perpendicular Grid Support Rods 13 that are connected to the Frame Posts 5 to support the weight of the multi-optioned heating source, typically a burner or fuel can, such as manufactured under the Trademark STERNO, to heat the water or food container that will be positioned above on the Food Container Platform.

Figure 4:
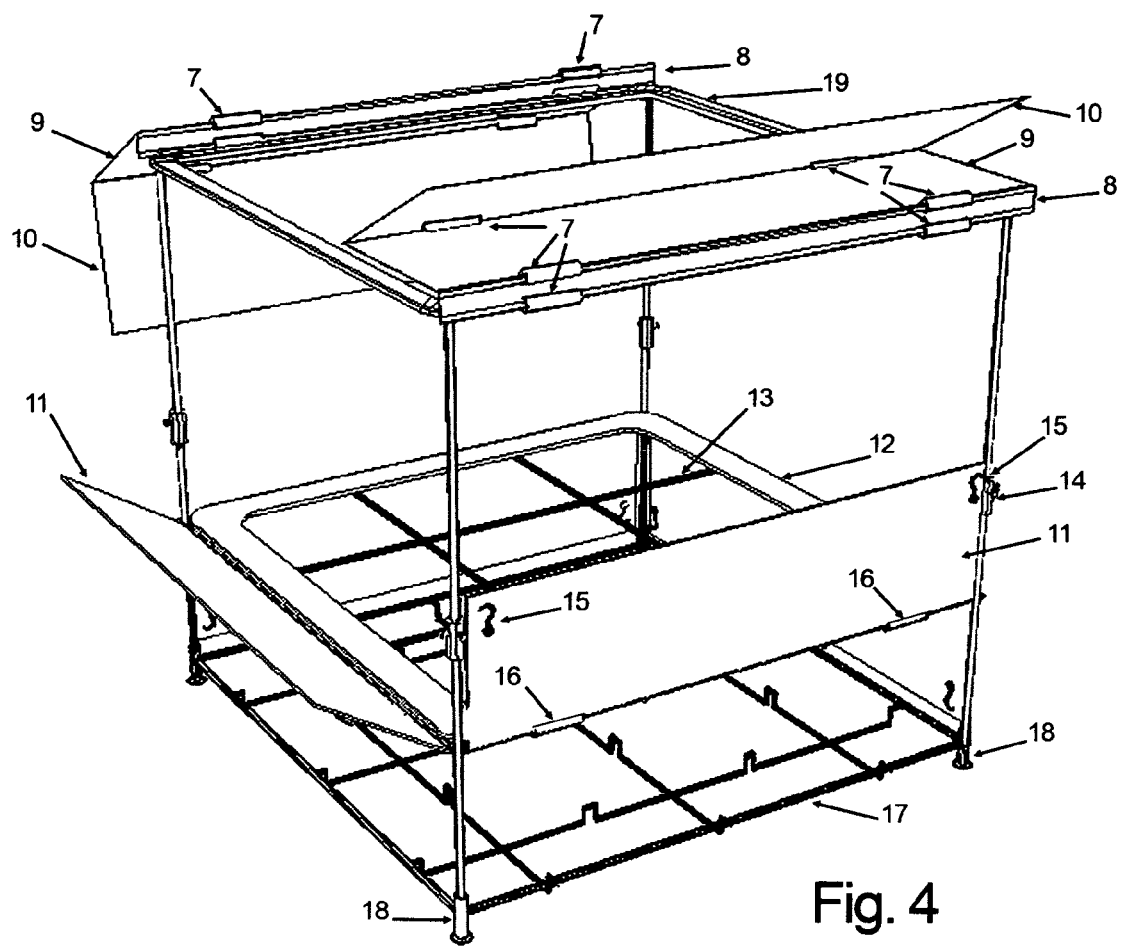
FIG. 4 is a perspective view of an embodiment of the Rigid Stand with its Lids and Flaps shown in one example of the multitude of options in an open position.
5) Rigid Stand Frame Posts (1 of 4)
6) Rigid Stand Multi-Fold Lid
7) Lid Hinge
8) Lid Fold Panel A
9) Lid Fold Panel B
10) Lid Fold Panel C
11) Rigid Stand Flap (1 of 4)
12) Rigid Stand Food Container Platform
13) Rigid Stand Platform Platform Grid Support Rods
14) Rigid Stand Post Attachment for Flap Hook
15) Rigid Stand Flap Hook
16) Rigid Stand Flap Hinge
17) Rigid Stand Bottom Heat Supply Grid Support
18) Rigid Stand Post Footing
19) Rigid Stand Top Food Container Rim

FIG. 4 illustrates various options of the Rigid Stand Lid and Flap opening positions. Additional features detailed are the Rigid Stand Post Footing 18 which caps the bottom of the Stand Frame Posts and Top Food Container Rim 19 to add top perimeter support to the Food Containers when placed into the Stand. The Flaps 11 pivot on the Flap Hinge 16 which is connects to the Stand on the outside perimeter rim of the Food Container Platform 12.

Figure 5:
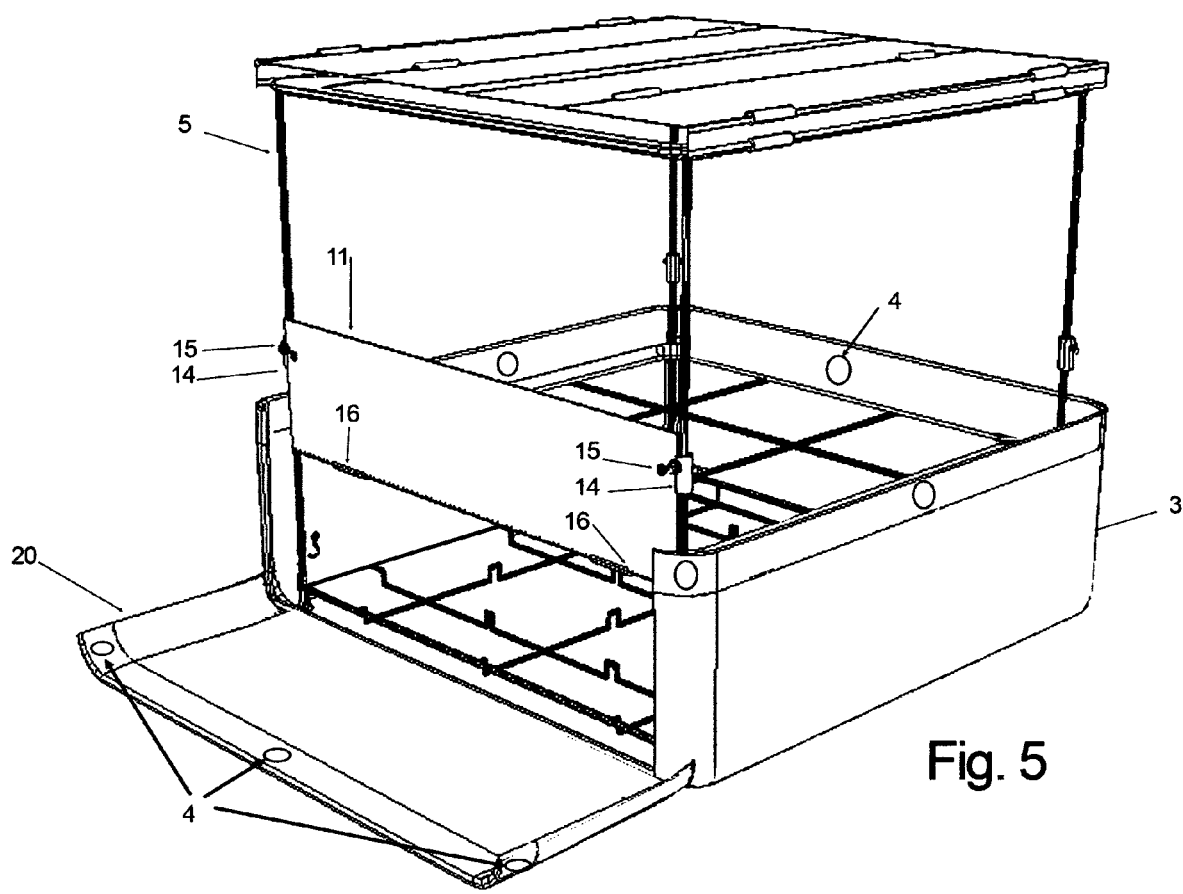
FIG. 5 is a perspective view of an embodiment of the Rigid Stand with one side Flap in an open position and the corresponding Heat Cover Base Flap in its open position.
4) Transport Case Fasteners
5) Rigid Stand Frame Posts (1 of 4)
6) Rigid Stand Multi-Fold Lid
7) Lid Hinge
8) Lid Fold Panel A
9) Lid Fold Panel B
10) Lid Fold Panel C
11) Rigid Stand Flap (1 of 4)
12) Rigid Stand Food Container Platform
13) Rigid Stand Platform Grid Support Rods
14) Rigid Stand Post Attachment for Flap Hook
15) Rigid Stand Flap Hook
16) Rigid Stand Flap Hinge
20) Transport Case/Heat Cover Bottom Quarter Flap (1 of 4)

FIG. 5 illustrates the Rigid Stand Flap 11 working in conjunction with the corresponding Heat Cover Flaps 20 that are pivotally attached to the floor of the Base Cover by a seam in the fabric. The opening and closing of these corresponding sets of Flaps allow for several different functions such as; access to the heat source, regulation of temperature controls of the heating source and prevention of heat loss due to exposure to cold temperature weather conditions or wind and precipitation.

Figure 5A:
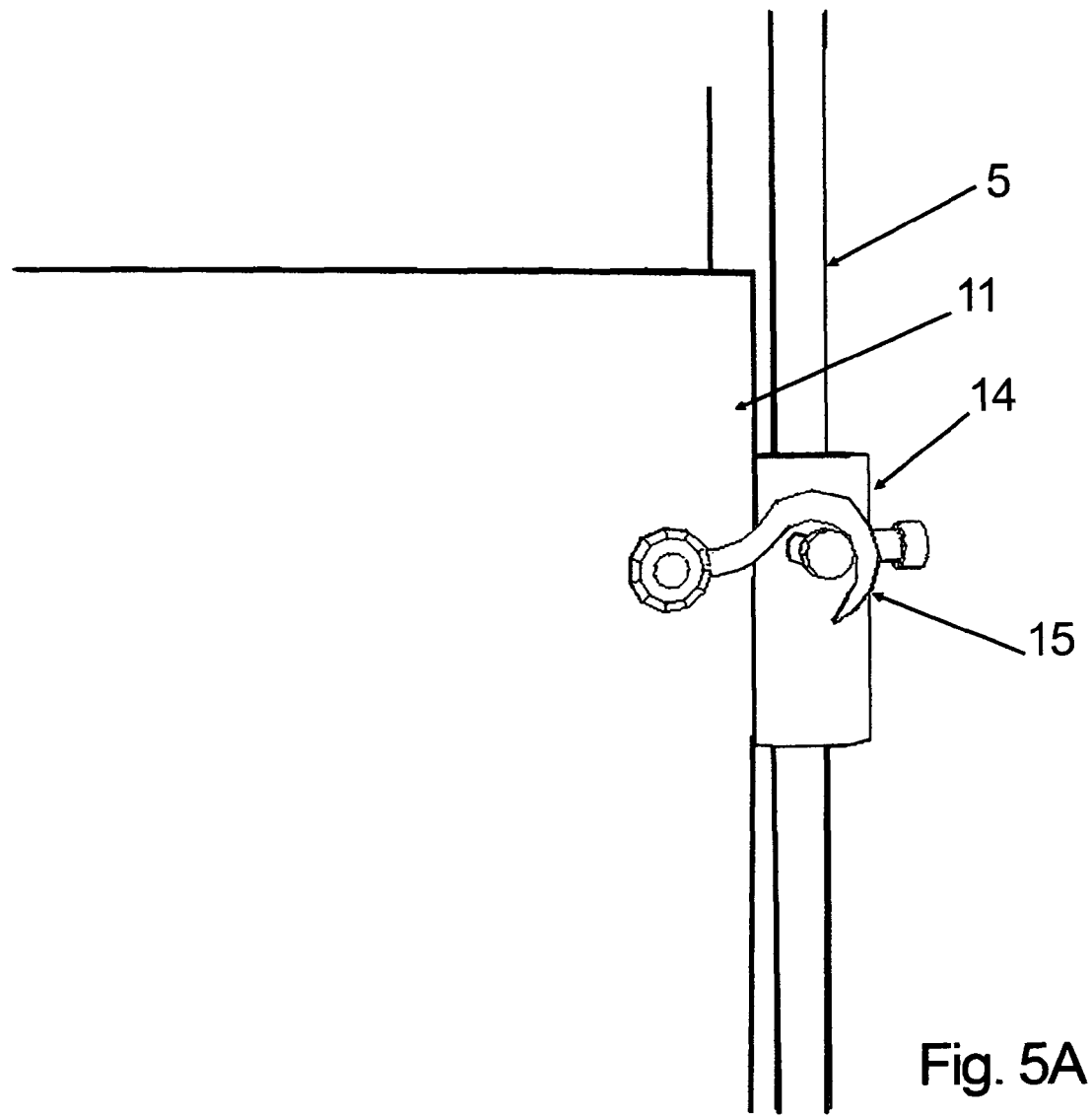
FIG. 5A is a detail perspective view of an embodiment of the Rigid Stand Post Attachment and the Flap Hook.
5) Rigid Stand Frame Posts (1 of 4)
6) Rigid Stand Multi-Fold Lid
11) Rigid Stand Flap (1 of 4)
14) Rigid Stand Post Attachment for Flap Hook
15) Rigid Stand Flap Hook
21) Large Boiler Pot (in Rigid Stand—Heating Position)
22) (2) Half Pots that inter-fit inside (1) Boiler Pot
23) Quarter Pots (2) Food Containers that inter-fit inside (1) Half Pot
24) Tri-Pots (3) Food Containers that inter-fit inside (1) Half Pot

FIG. 5A is a detail illustration of the mechanism whereby the Flap 11 is held in its open pivot position by a Flap Hook 15 which is connected to lower inside position of the Flap to pivot about a corresponding Post Attachment for Flap Hook 15 that is connected to the Stand Frame Post 5. when the Flap is rotated 180 degrees from its closed position about its Flap Hinge 16 as shown in FIG. 4.

Figure 6:
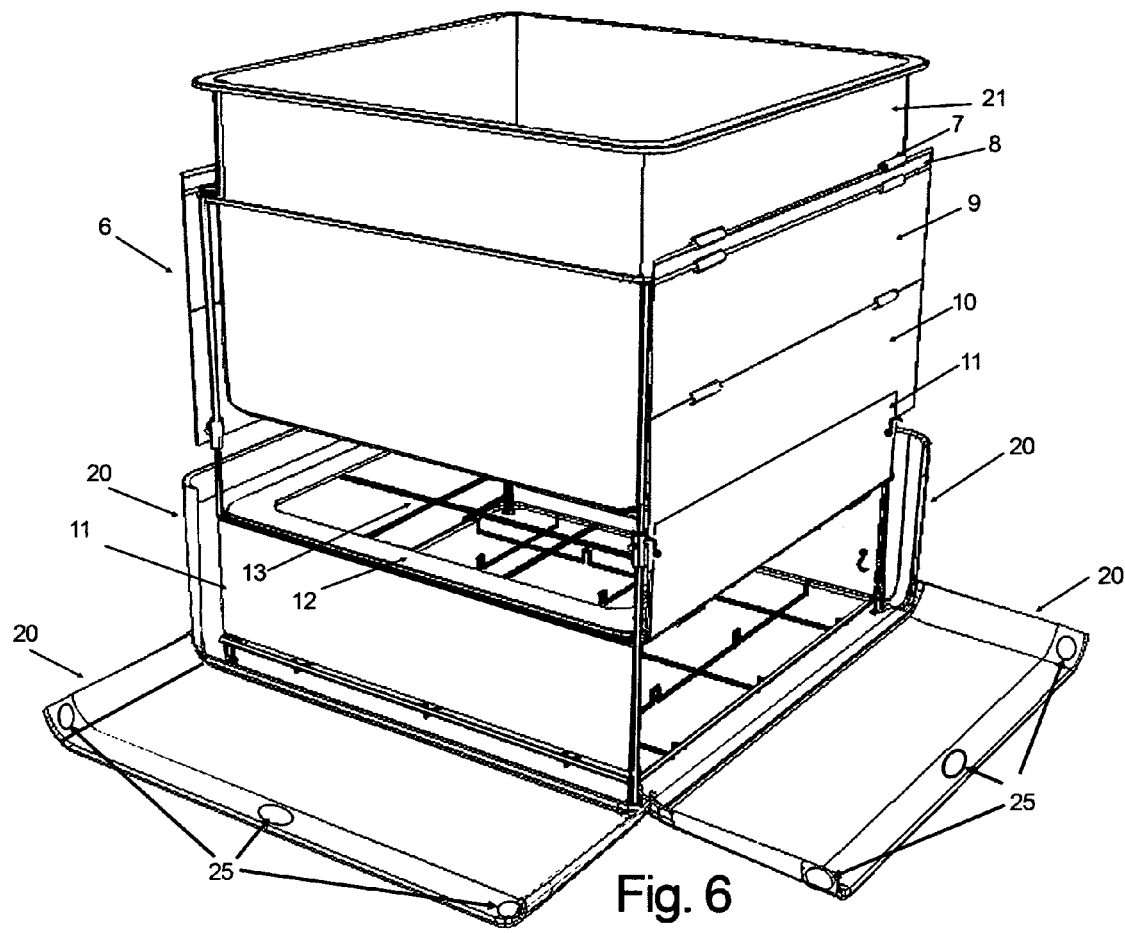
FIG. 6 is a perspective view of an embodiment of the Rigid Stand with two side Flap in an open position and the corresponding Heat Cover Base Flaps in its open positions with the Boiler Pot in a position as it slides into the Rigid Stand.
5) Rigid Stand Frame Posts (1 of 4)
6) Rigid Stand Multi-Fold Lid
7) Lid Hinge
8) Lid Fold Panel A
9) Lid Fold Panel C
10) Lid Fold Panel C
11) Rigid Stand Flap (1 of 4)
12) Rigid Stand Food Container Platform
13) Rigid Stand Platform Grid Support Rods
14) Rigid Stand Post Attachment for Flap Hook
15) Rigid Stand Flap Hook
16) Rigid Stand Flap Hinge
20) Transport Case/Heat Cover Bottom Quarter Flap (1 of 4)
21) Large Boiler Pot (in Rigid Stand—Sliding Down Position)

FIG. 6. illustrates the Boiler Pot 21 in position as it slides down inside the Stand before it rests on the Food Container Platform 12.

Figure 7:
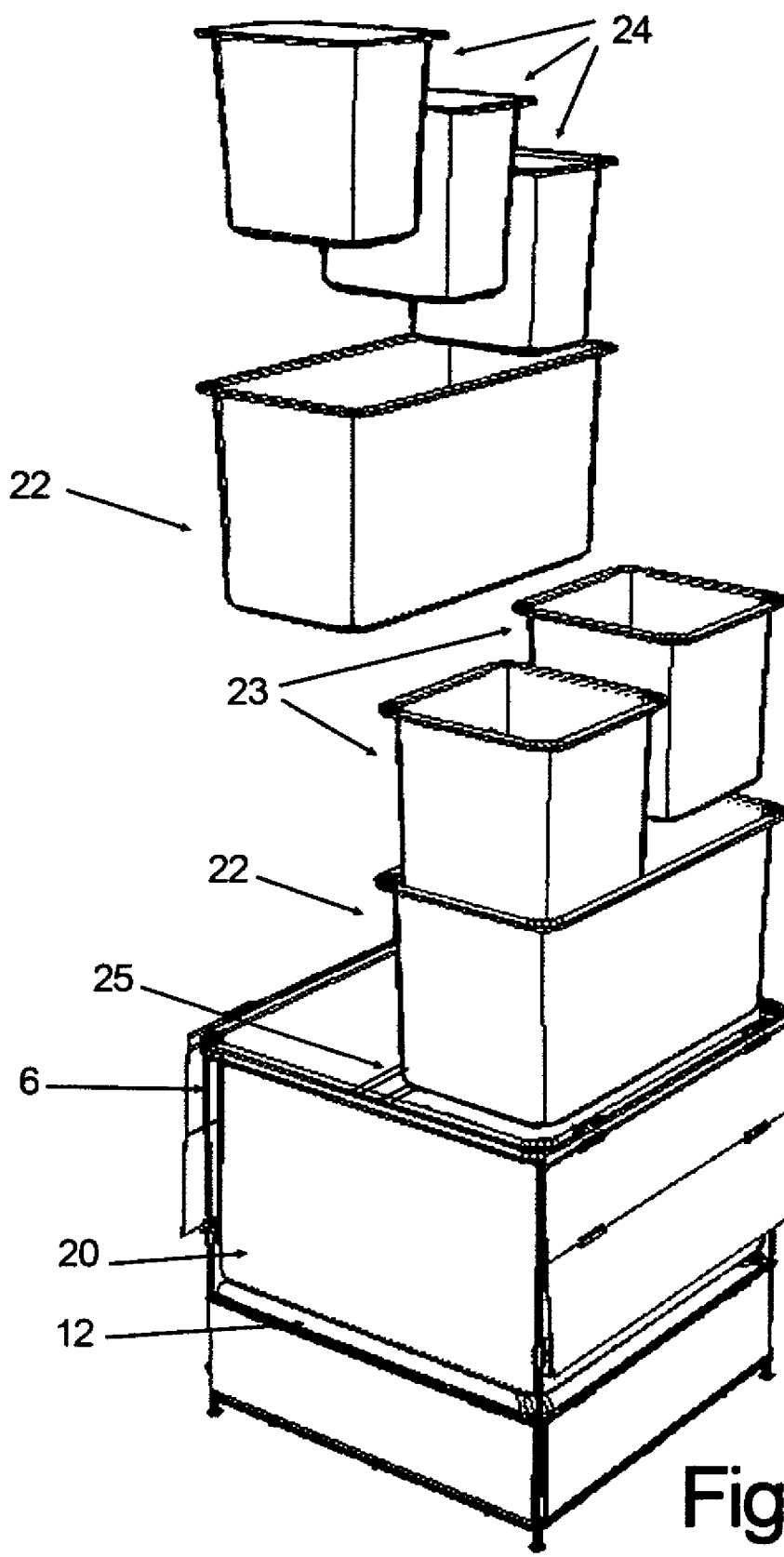
FIG. 7 is an illustration of an exploded view of the Rigid Stand with the Boiler Pot in its final heating position and the remaining inter-fitting Containers positioned above as they would inter-fit in relation to their position within one another.
5) Rigid Stand Frame Posts (1 of 4)
6) Rigid Stand Multi-Fold Lid
7) Lid Hinge
8) Lid Fold Panel A
9) Lid Fold Panel B
10) Lid Fold Panel C
11) Rigid Stand Flap (1 of 4)
12) Rigid Stand Food Container Platform
13) Rigid Stand Platform Grid Support Rods
14) Rigid Stand Post Attachment for Flap Hook
15) Rigid Stand Flap Hook
16) Rigid Stand Flap Hinge 20) Transport Case/Heat Cover Bottom Quarter Flap (1 of 4)
21) Large Boiler Pot (in Rigid Stand—Heating Position)
22) (2) Half Pots that inter-fit inside (1) Boiler Pot
23) Quarter Pots (2) Food Containers that inter-fit inside (1) Half Pot
24) Tri-Pots (3) Food Containers that inter-fit inside (1) Half Pot
25) Center Bar

FIG. 7 illustrates an exploded view of how the inter-fitting containers are positioned to one another, whereby the Boiler Pot 21, secured on the Food Container Platform 12, acts as a double boiler pot to contain heated water and then supports the remaining containers in various configurations. A Center Bar is positioned over the mid point of the Boiler Pot to support the center weight of the multiple configurations of possibility for the Half Pots 22, Quarters Pots 23 or Tri-Pots 24.

Figure 8:
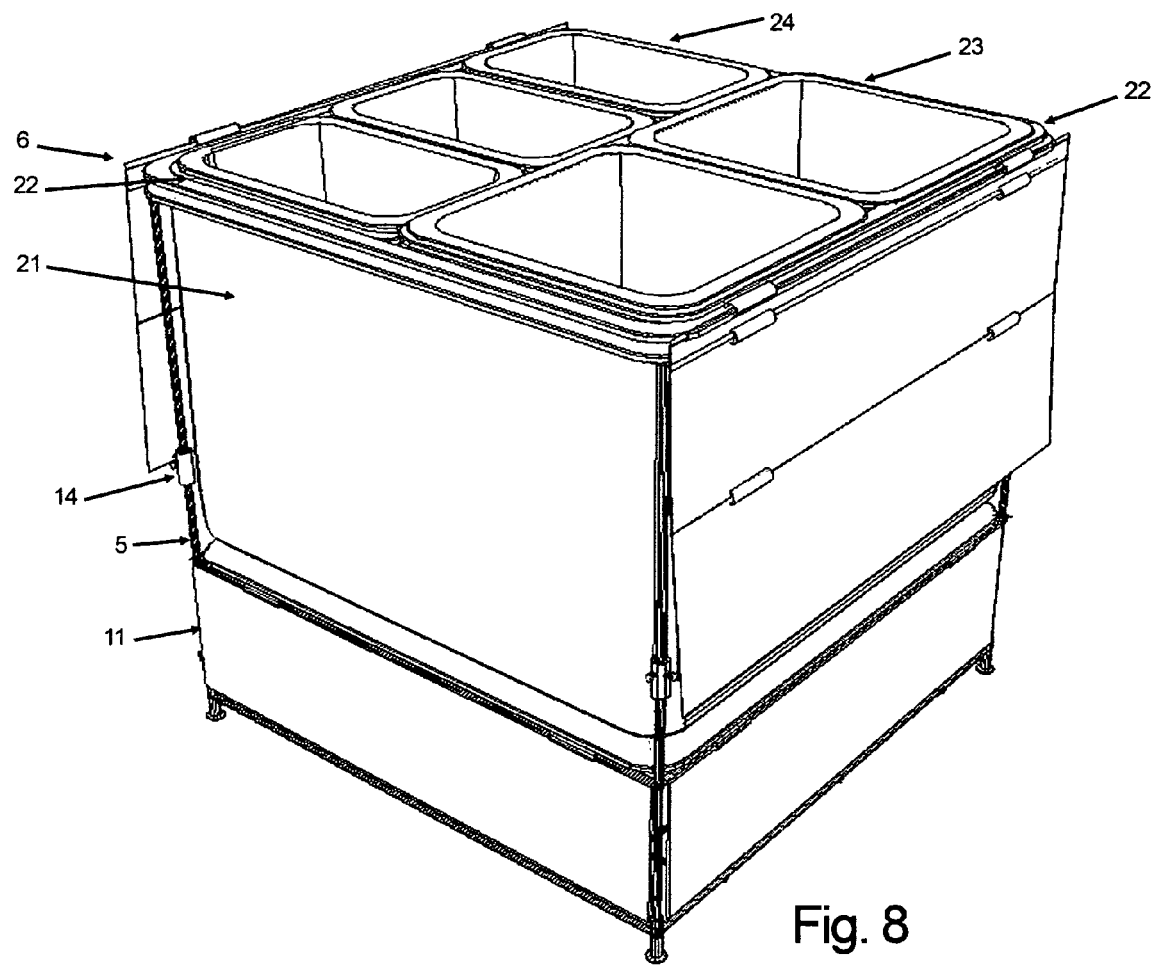
FIG. 8 is an illustration of a collapsed view of the Rigid Stand with the Boiler Pot in its final heating position and the remaining inter-fitting Containers as they position within one another with the Lid in one example of an open position.

FIG. 8 illustrates the Stand and all of the Food Containers in their collapsed inter-fitting position with the Stand's Multi-Fold Lid in it's open position.

Figure 9:
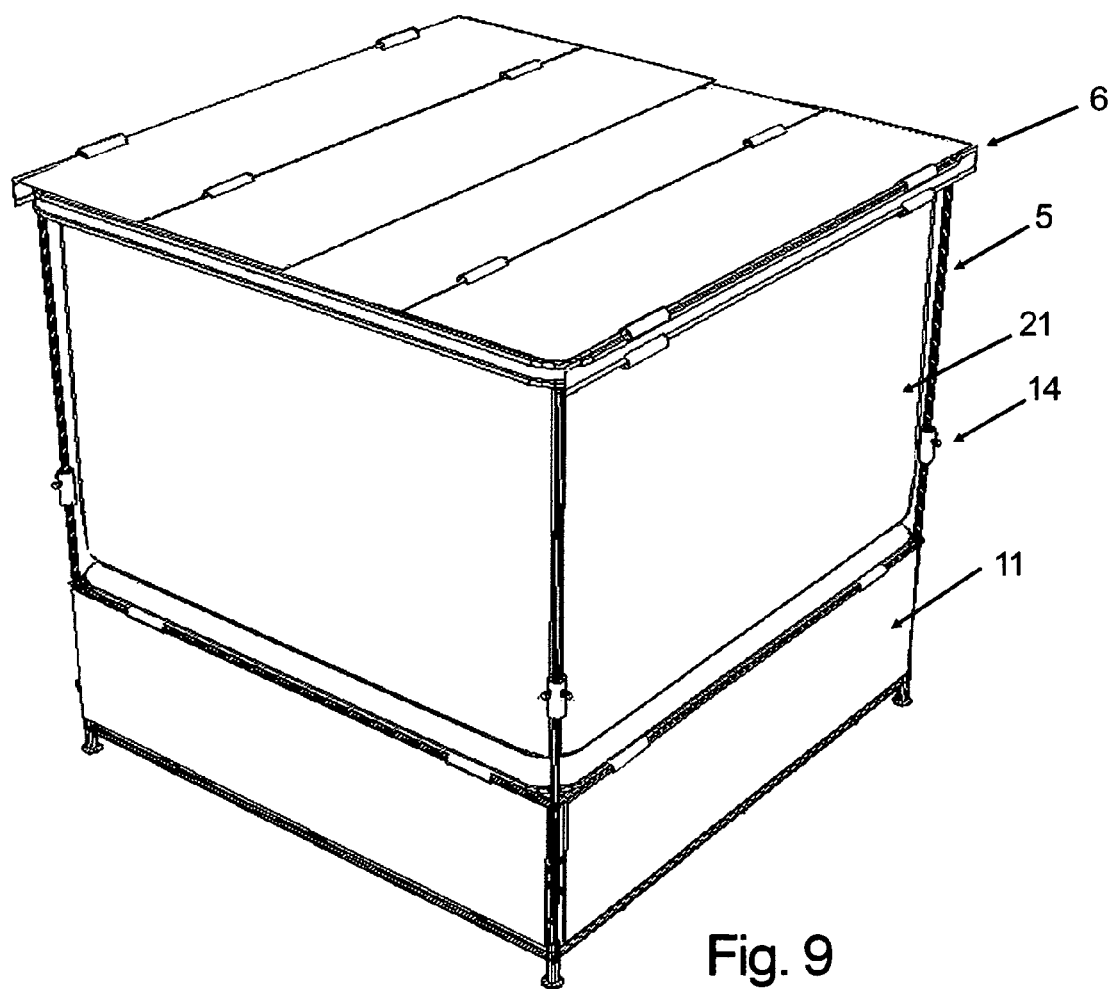
FIG. 9 is an illustration of a collapsed view of the Rigid Stand with the Boiler Pot in its final heating position Lid in the closed position.

FIG. 9 illustrates the entire unit in its collapsed closed position. The operator now has the choice, depending upon the environmental conditions, as to how to configure the flaps of the stand and cover. Best practices would dictate that the flaps would remain closed and the Hood part of the cover would be replaced over the Stand to prevent heat escape from the cooking unit and protect against incidental burn accidents from touching the unit when it is hot.

We claim:

1. A portable cooking unit comprising
a plurality of vertically extending, spaced posts, each post having a footing at a bottom end thereof;
a bottom heat supply grid support interconnecting said posts above and adjacent each footing, said bottom heat supply grid supporting a multi-optioned heat source including a burner or a fuel source;
a multi-fold lid interconnecting top ends of said posts, said lid comprising two halves, each half comprising a plurality of panels each hinged to an adjacent panel with an end fold panel at opposite ends of said lid folded down over top ends of said posts, with adjacent halves not connected either to allow some panels to be folded over to form a top opening into said cooking unit, said opening being adjustable by the number of panels being folded over, or to cover completely said top opening;
a mid-section platform interconnecting said posts between said bottom heat supply grid and said lid comprising a grid structure to accommodate containers for cooking food directly above said bottom heat supply grid support;
side flaps on all sides of said unit hinged to said mid-section platform for rotation, each flap rotatable between a downward extending position covering an area between said mid-section platform and said bottom heat support grid and an upwardly extending position enclosing an area above said mid-section platform, said flaps being independently movable to control heat temperature and direction and amount of air flow through said cooking unit; and
said lid with all said panels folded over sides of said cooking unit accommodating a single pot or a plurality of inter-fitting containers for cooking food above that of said mid-section platform, thereby providing said cooking unit with two levels of cooking above said heat source.

2. The portable cooking unit of claim 1 having a transport base enclosing a bottom portion of said unit below said mid-section platform, said transport base having a floor and sides which are each individually, pivotally attached to said floor for providing access to said heat source and regulation of heat in said unit; and
means for enclosing and transporting said unit without disassembly thereof thereby allowing quick deployment of said unit for cooking.

3. The portable cooking unit of claim 2 in which said posts are located on corners of said unit.

4. The portable cooking unit of claim 3 in which said enclosing and transporting means comprises said sides of said transport base having means for attaching adjacent sides to each other when deployed in an upwardly extending position enclosing a bottom portion of said unit below said mid-section platform, and a cover slidable over a top and sides of said unit to engage top edges of said sides of said transport base, with said cover having a handle to carry, said unit within said cover, whereby said unit is transportable without disassembly.

5. The portable cooking unit of claim 4 having multiple, inter-fitting nested containers that are configurable in multiple combinations for being supported in said mid-section platform to allow multiple food containers to be heated simultaneously.

6. The portable cooking unit of claim 5 in which said flaps each have a hook to engage a protuberance on a post when said flap is in its upwardly extending position.

7. The portable cooking unit of claim 4 wherein said cover includes an upper sleeve cover portion insertable over a top portion of said portable cooking unit and a lower base cover portion enclosing a bottom portion of said portable cooking unit, said upper sleeve cover portion joinable to said lower base cover portion, said lower base cover portion having lower side cover flaps on all sides of said lower base cover portion for rotation, each said lower side cover flap rotatable between a downward extending open position exposing an area adjacent said bottom heat support grid and an upwardly extending position enclosing an area adjacent said bottom heat support grid, each separate respective lower side cover flap being independently movable singularly or in combination with at least one of said other respective lower side cover flaps to control heat temperature, and direction and amount of air flow through said cooking unit, in conjunction with rotation of said side flaps of said portable cooking unit between respective open and closed position thereof.

\* \* \* \* \*